United States Patent
Bocchi (10) Patent No.: US 11,811,906 B2
(45) Date of Patent: Nov. 7, 2023

(54) METHOD FOR PERFORMING CRYPTOGRAPHIC OPERATIONS ON DATA IN A PROCESSING DEVICE, CORRESPONDING PROCESSING DEVICE AND COMPUTER PROGRAM PRODUCT

(71) Applicant: STMICROELECTRONICS S.r.l., Agrate Brianza (IT)

(72) Inventor: Matteo Bocchi, Brugherio (IT)

(73) Assignee: STMICROELECTRONICS S.r.l., Agrate Brianza (IT)

(*) Notice: Subject to any disclaimer, the term of this patent is extended or adjusted under 35 U.S.C. 154(b) by 87 days.

(21) Appl. No.: 17/203,590

(22) Filed: Mar. 16, 2021

(65) Prior Publication Data

US 2021/0306134 A1    Sep. 30, 2021

(30) Foreign Application Priority Data

Mar. 27, 2020 (IT) .................. 102020000006475

(51) Int. Cl.
  *H04L 9/00* (2022.01)
  *G06F 7/76* (2006.01)
  *H04L 9/30* (2006.01)

(52) U.S. Cl.
  CPC ............ *H04L 9/003* (2013.01); *G06F 7/764* (2013.01); *G06F 7/768* (2013.01); *H04L 9/3066* (2013.01); *H04L 2209/046* (2013.01)

(58) Field of Classification Search
  CPC . H04L 9/003; H04L 9/3066; H04L 2209/046; G06F 7/764; G06F 7/768
  See application file for complete search history.

(56) References Cited

U.S. PATENT DOCUMENTS

| 8,781,110 B2* | 7/2014 | Gopal | G06F 7/725 |
| | | | 708/492 |
| 9,590,805 B1* | 3/2017 | Parkinson | H04L 9/3247 |
| 9,772,821 B2 | 9/2017 | Feix et al. | |
| 2009/0067619 A1* | 3/2009 | Eberle | G06F 7/724 |
| | | | 380/28 |

(Continued)

FOREIGN PATENT DOCUMENTS

| WO | 2015/199675 A1 | 12/2015 |
| WO | 2019/089590 A1 | 5/2019 |

OTHER PUBLICATIONS

Nascimento, E., Chmielewski, Applying Horizontal Clustering Side-Channel Attacks on Embedded ECC Implementations. In: Eisenbarth, T., Teglia, Y. (eds) Smart Card Research and Advanced Applications. CARDIS 2017. Lecture Notes in Computer Science(), vol. 10728. Springer, Cham. (Year: 2018).*

(Continued)

*Primary Examiner* — Saleh Najjar
*Assistant Examiner* — Devin E Almeida
(74) *Attorney, Agent, or Firm* — SEED INTELLECTUAL PROPERTY LAW GROUP LLP (57) ABSTRACT

Cryptographic circuitry, in operation, conditionally swaps a first operand and a second operand of a cryptographic operation based on a control value. The conditional swapping includes setting a first mask of a number of bits and a second mask of the number of bits based on the control value, the first mask and the second mask being complementary and having a same Hamming weight. A result of a bitwise XOR operation on the first operand and the second operand is stored as a temporary value. A combination of bitwise logical operations are performed to conditionally swap the first operand and the second operand.

25 Claims, 2 Drawing Sheets

(56) References Cited

U.S. PATENT DOCUMENTS

| | | | |
|---|---|---|---|
| 2010/0322422 A1 | 12/2010 | Al-Gahtani et al. | |
| 2012/0207298 A1* | 8/2012 | Meyer | G06F 7/725 380/28 |
| 2015/0288520 A1 | 10/2015 | Jacobson et al. | |
| 2019/0379529 A1* | 12/2019 | Meyer | H04L 9/008 |
| 2020/0351073 A1* | 11/2020 | Loiseau | H04L 9/3066 |
| 2021/0165633 A1* | 6/2021 | Guilley | G06F 7/501 |
| 2021/0194689 A1* | 6/2021 | Susella | H04L 9/085 |
| 2021/0243006 A1 | 8/2021 | Meyer | |
| 2022/0075879 A1* | 3/2022 | Hamburg | G06F 21/602 |

OTHER PUBLICATIONS

Okeya et al., "A Fast Scalar Multiplication Method with Randomized Projective Coordinates on a Montgomery-Form Elliptic Curve Secure against Side Channel Attacks," *ICIS Conference*, Apr. 2002, LNCS 2288, pp. 428-439.

Heyszl et al., "Localized Electromagnetic Analysis of Cryptographic Implementations," Cryptographers' Track at the RSA Conference, Feb. 27-Mar. 2, 2012, San Francisco, CA, pp. 231-244.

Menezes et al., *Handbook of Applied Cryptography*, CRC Press, Boca Raton, FL, Chapter 14, "Efficient Implementation," pp. 591-634, 1997.

Mukhtar et al., "Machine-Learning-Based Side-Channel Evaluation of Elliptic-Curve Cryptographic FPGA Processor," Appl. Sci. 9(64): 2019, 20 pages.

Wikipedia, "Swap (computer programming," downloaded on Jul. 28, 2020, from https://en.wikipedia.org/w/index.php?title=Swap_(computer_programming)&oldid=880864496, 4 pages.

Heyszl et al., "Localized Electromagnetic Analysis of Cryptographic Implementations," Cryptographers' Track at the RSA Conference, Francisco, CA, Feb. 27-Mar. 2, 2012, pp. 231-244.

* cited by examiner

METHOD FOR PERFORMING CRYPTOGRAPHIC OPERATIONS ON DATA IN A PROCESSING DEVICE, CORRESPONDING PROCESSING DEVICE AND COMPUTER PROGRAM PRODUCT

BACKGROUND

Technical Field

The present description relates to techniques for performing cryptographic operations on data in a processing device.

Various embodiments may apply, e.g., to smartcard, microcontrollers, set-top-box using an encryption or digital signature scheme.

Description of the Related Art

Cryptographic protocols are abstract or concrete protocols that perform a security-related function and apply cryptographic methods, often as sequences of cryptographic primitives.

In the field of protection from Side Channel Attacks in devices which uses cryptographic algorithms, e.g., microcontroller implementing encryption algorithms, such as ECC or RSA, vertical Side Channel Attacks (SCA) are known, where the attacker can encrypt arbitrary data (input) using the device, in order to get the cryptographic key used by the encryption algorithm. The attackers record side channel information during encryption of known input data, the side channel being represented by power consumption, electromagnetic radiation, or other similar quantities.

The side channel is linked with the data processed by the device, which are the cryptographic key and the data of the attacker fed as input, which represent therefore known data.

The attacker records many "traces" with different known input data and a constant unknown key, making hypotheses on the value of a portion of the cryptographic key, and uses statistical methods to verify such hypotheses using the traces. To apply such statistical methods the attacker needs to use many traces, each with different and known input data and constant key.

However, in asymmetric cryptography there are mathematical ways to modify the secret key for each execution such that the result of the operation does not change, although the data used during the computation changes. Thus, the attacker cannot collect many traces because the key is not constant anymore.

For this reason, when the attacker needs to work on a single trace, the attacker deploys the so-called Horizontal Attacks.

In a device to be protected, e.g., processing unit or microcontroller, usually there is a memory, which stores input/output data and intermediate values, a controller, which reads words from RAM memory and stores them into registers, then "calls" the multiplier on registers, e.g., a multiplier unit which performs multiplication operation on operands stored in the registers. The multiplier multiplies operands and writes the result to the RAM memory. In such a situation over 95% of the computation is done within the multiplier.

Figure 1:
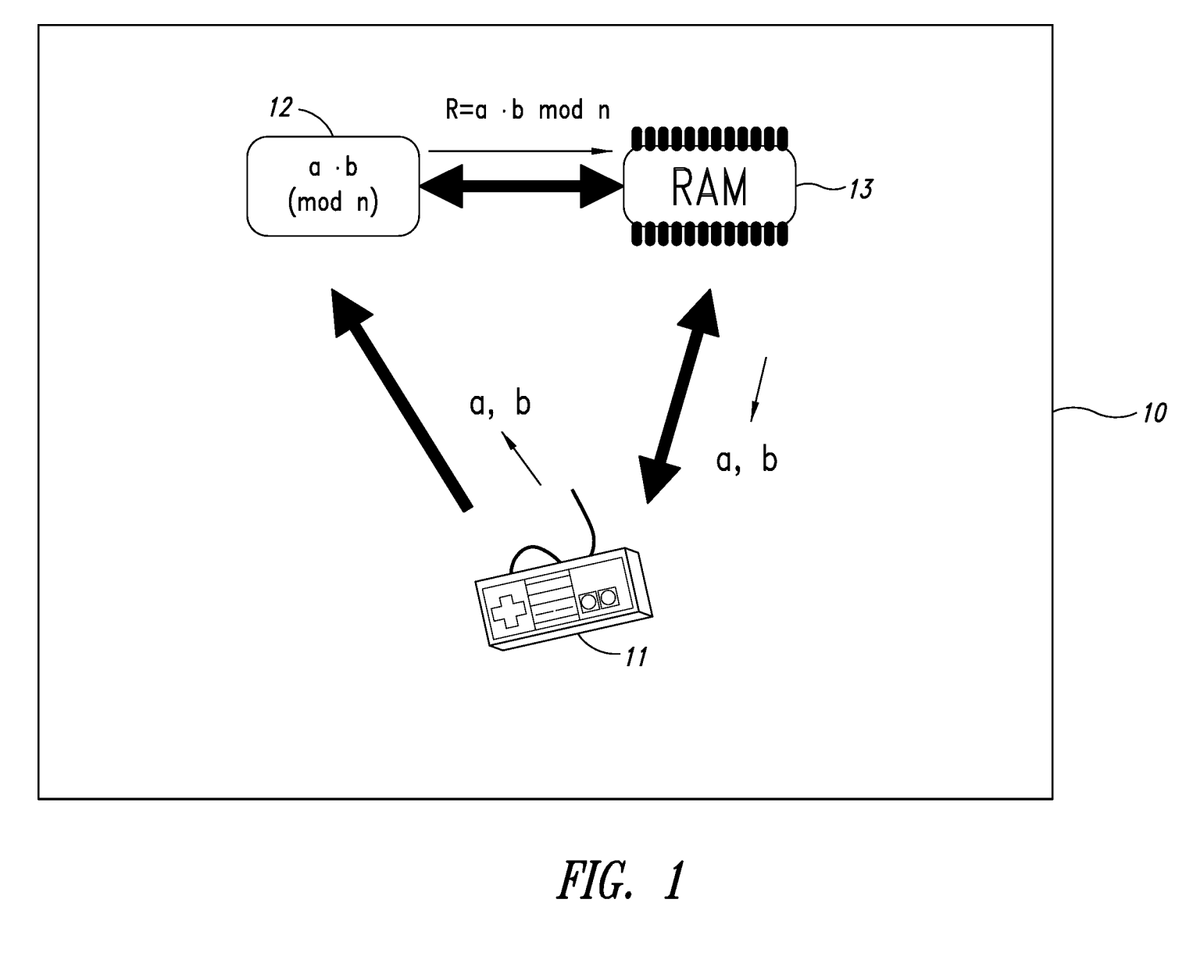

To this regard, in FIG. 1 it is shown an example of processing circuitry 10 which includes a controller 11, such as a processing core, which reads words, indicated as a and b in FIG. 1, from a memory 13, e.g., a RAM memory, and stores them into registers provided in the controller 11, then calls a multiplier 12 on the content of the registers, words a, b. The multiplier 12 performs multiplication operation on operands a, b stored in the registers of the controller 11. The multiplier 12 multiplies operands, e.g., performs a modulo n multiplication $R = a \cdot b \mod n$, and writes the result R to the RAM memory 13.

With reference to a conventional processing device architecture, the controller 11 and the multiplier 12 may correspond to the control circuitry and ALU of a processing unit such as a CPU, while the memory 13 can be external with respect to the processing device 10. It is underlined that such elements 11, 12, 13 in variant embodiments can be either hardware or software implemented.

In asymmetric cryptography it can be used for instance RSA (Rivest-Shamir-Adleman) cryptography which involves a loop implementing Modular Exponentiation, or ECC (Elliptic Curve Cryptography) which involves a loop implementing Elliptic Curve Scalar Multiplication.

In ECC cryptography a main loop implementing iteratively a scalar multiplication of given operand P by the scalar k, the secret key, is used. At the beginning, outside of such loop, a first operand $Q_0$ is initialized to the point at infinity and a second operand $Q_1$ is set to the given operand P.

After all the bits of the secret key k have been processed in the main loop, the first operand $Q_0$ is returned as result of k*P. Such loop is implemented as shown in the following group of instructions (1), representing the iteration for secret key bit value $k_i$:

L1. if $k_i$=0:

L2. $Q_1$=Add($Q_1,Q_0$)

L3. $Q_0$=Double($Q_0$)

L4. else:

L5. $Q_0$=Add($Q_0,Q_1$)

L6. $Q_1$=Double($Q_1$)     (1)

where $k_i$ is the i-th bit of the secret key k, $Q_0$, $Q_1$ the first and second operands read from the memory 13 or also from the corresponding registers of the controller unit 11, Add and Double the elliptic curve point addition and elliptic curve point doubling operations. $Q_1$, $Q_0$ are points expressed in projective format (X,Y,Z) where for instance (x,y)=X/Z, Y/Z. In variant embodiments, other types of projective coordinates can be used, such as $(x,y) = X/Z^2, Y/Z^3$.

The main loop (1) of the point multiplication thus includes that:

for each bit $k_i$ of the secret key k, specifically each bit i if the bit is 1 bit in length, if such bit $k_i$ is zero, the second operand $Q_1$ is set, written in the same address of the memory 13, corresponding to the operand variable, equal to the sum of the two operands $Q_1,Q_0$ and the first operand $Q_0$ is multiplied by two, else the first operand $Q_0$ is equal to the sum of the two operands $Q_1,Q_0$ and the second operand $Q_1$ is multiplied by two.

Also, by way of example in RSA the main loop is implemented by the following group of instructions (2), representing the iteration for each secret key bit $k_i$;

M1. if $k_i$=0:

M2. $q_1=s*q_1$

M3. $s=s*s$

M4. else:

M5. $q_0 = s * q_0$

M6. $s = s * s$ (2)

where s is a value called square, $q_0$ or $q_1$ the operands read from the memory 13, $q_0$ in general representing a base of the modular exponentiation and $q_1$ a dummy integer value.

The RSA main loop of the point multiplication thus includes that:

for each bit $k_i$ of the secret key k, specifically each bit $k_i$, if such bit $k_i$ is zero, the second operand is set equal $q_1$ to the second operand $q_1$ multiplied by the square s, $s*q_1$, and the square s set equal to square multiplied by itself, $s*s$, else the first operand $s*q_0$ is set equal to the first operand $q_0$ multiplied by the square s, $s*q_0$, and the square s set equal to square multiplied by itself, $s*s$.

Three families of Horizontal Attacks are usually identified:

Attacks on Secret Bit Manipulation
Attacks on Addresses
Attacks on Data

Based on read/write patterns for instance, for ECC asymmetric cryptography with the multiplication loop (1), if the attacker can understand:

whether the ECC operand $Q_0$ or $Q_1$ is read or written during the Double operation, or whether the ECC operand $Q_0$ or $Q_1$ is written during the Add operation, then the attacker can recover the secret key bits $k_i$.

Based on read/write patterns for instance, for RSA asymmetric cryptography with the multiplication loop (2), if the attacker can understand whether the RSA operand $q_0$ or $q_1$ is read or written during the multiplication, then the attacker can recover the secret key bits $k_i$.

In Attacks on Addresses Horizontal Attacks (HA), this family of attacks relies on a single trace and split the single trace in subtraces, one for each iteration of the loop, then the attacker tries to find similarities (or differences) among subtraces with same (or different) value of the secret key bits $k_i$.

With statistical methods it is possible to identify the so called "leakage points" where the secret key bits $k_i$ can be extracted.

For instance, the IF . . . ELSE causes branches that produce different sequences of instruction performed, therefore different timing measurement. The attacker is able to retrieve if the key bit was 0 or 1.

From the publication "*Localized Electromagnetic Analysis of Cryptographic Implementations*", by Johann Heyszl, Stefan Mangard, Benedikt Heinz, Frederic Stumpf, and Georg Sigl it is known a method of protection from horizontal side channel attacks where it is used a arithmetic conditional swap, or cswap, operation defined as follows, by instructions (3):

I1. def cswap($Q_0, Q_1, c$):

I2. $T = Q_0 + Q_1$

I3. $Q_0 = T - Q_{1-c} // Q_0 = Q_0$ if $c = 0$ else $Q_0 = Q_1$

I4. $Q_1 = T - Q_c // Q_1 = Q_1$ if $c = 1$ else $Q_1 = Q_0$ (3)

where T is the value sum of the operands, c is a control bit value, $Q_{1-c}$ and $Q_c$ are subtraction values which correspond to operands $Q_0$ or $Q_1$ respectively, depending on the value of the control value c, which value determines if the value of the operands $Q_0$ and $Q_1$ is swapped, one with respect to the other, or no.

The scalar multiplication operation as a whole, comprising the main multiplication loop, ECC loop (1) here below, may be implemented as follows, with the group of instructions (4).

For example, a mask variable swap is initialized, NO, to zero, swap=0, then for each bit $k_i$, for i=1 to len, len being the number of bits of the secret key k:

N1 if swap $\oplus k_i = 0$:

N2 $Q_1 = \text{Add}(Q_1, Q_0)$

N3 $Q_0 = \text{Double}(Q_0)$

N4 else:

N5 $Q_0 = \text{Add}(Q_0, Q_1)$

N6 $Q_1 = \text{Double}(Q_1)$

N7 $r = \text{random\_bit}(\ )$

N8 cswap($Q_0, Q_1$, swap$\oplus r$)

N9 swap=r

N10 end for (4)

As it can be seen a variable swap is set at zero before performing an iteration, and it is then XORed (N1 step) with the i-th bit of the secret key $k_i$ to form the masked control bit swap $\oplus k_i$, which value determines which of the two different sets of equations is implemented in the loop (1), N2, N3 or N5, N6. Then in a step N7 a random bit r value is set by applying random generation function random_bit( ), which is either logic zero or logic one. The random bit r then is XORed with the mask variable swap to determine the control bit c value for the cswap function, which is performed next (step N8, corresponding for instance to instructions (3)). Then, before the next iteration, in step N9 the variable swap is set at the random bit r value. It is observed that the iteration is performed for each bit of the secret key however the reading operation of the secret key k to acquire such bits from the memory can be performed also word by word.

Steps N1-N6 correspond to the ECC scalar multiplication loop (1) shown above, which can be equivalently substituted by the RSA modular exponentiation loop (2).

Thus, this method exploits a known technique in software development to avoid cache-timing issues, which provides conditionally swapping two big integers based on the value of bit.

The limitations of this method include that an address Horizontal Attacks on the reading of subtraction value $Q_c$ from cswap operation will recover the random bit r. Also it is possible to use a Horizontal Attack to recover the value swap$\oplus k_i$, and another Horizontal Attack to recover the control value c. With both attacks it is possible to recover the secret key bits $k_i$. Also the operation $Q_0 = Q_0$ in performing cswap function is significantly different, e.g., with respect to consumption, from the operation $Q_0 = Q_1$. This method also does not protect the first iteration.

BRIEF SUMMARY

The present description relates to techniques for performing cryptographic operations on data in a processing device including performing a conditional swap on a first and a second operand on the basis of a control bit value, such conditional swap comprising defining a mask which value depends on the value of the control bit.

Various embodiments may apply, e.g., to smartcard, microcontrollers, set-top-box using an encryption or digital signature scheme.

The conditional SWAP swaps two input variables, e.g., a,b if the input control bit or flag c is 1, otherwise leaves them unmodified.

In a general form the CSWAP can use a mask uint32_t mask:

cswap(a, b, flg):
  unit32_t mask=–flg
    for (i=0; i<size; i++)
      x=mask & (a[i]XOR b[i])
      a[i]=a[i]XOR x
      b[i]=a[i]XOR x
When bit=0, input does not change:
cswap(a, b, flg):
  unit32_t mask=–0=0
    for (i=0; i<size; i++)
      x=0 & (a[i]XOR b[i])=0
      a[i]=a[i]XOR 0=a[i]
      b[i]=a[i]XOR 0=b[i]
When bit=1, input are swapped:
cswap(a, b, flg):
  unit32_t mask=––1=0xFFFFFFFF
    for (i=0; i<size; i++)
      x=a[i]XOR b[i]
      a[i]=a[i]XOR a[i]XOR b[i]=b[i]
      b[i]=a[i]XOR a[i]XOR b[i]=a[i]

Here fig indicates the flag, the control bit c of the CSWAP operation.

Thus, if someone can understand if the variables are swapped or not, can steal the secret key.

Since CSWAP was born to protect against timing attacks, is however vulnerable to power analysis, because power analysis can detect if final values change or remain the same. Moreover, the mask can be identified, if it is 0x00000000 or 0xFFFFFFFF One or more embodiments provides a method for cryptographic operation of data in a processing device including performing an operation that facilitates addressing the drawbacks of the prior art and in particular resistance to combined Horizontal Attacks.

One or more embodiments may refer to a corresponding processing device performing one or more of the methods and to a computer program product that can be loaded into the memory of at least one computer and comprises parts of software code that are able to execute the steps of one or more of the methods when the product is run on at least one computer. As used herein, reference to such a computer program product is understood as being equivalent to reference to a computer-readable means containing instructions for controlling the processing system in order to co-ordinate implementation of the method according to the embodiments. Reference to "at least one computer" is evidently intended to highlight the possibility of the present embodiments being implemented in modular and/or distributed form.

According to the solution described herein, in an embodiment a method for performing cryptographic operations on data in a processing device includes:
  performing a conditional swap on a first and a second operand on the basis of a control bit value, said conditional swap comprising:
    defining a mask which value depends on the value of the control bit, wherein said conditional swap comprises:
      converting the control bit value in a first or second string of bits of a given length depending on the value of the control bit, said first or second string of bits being complementary and having a same Hamming weight;
      setting as a first mask the first string and as a second mask the second string;
      storing in a temporary variable the value of a XOR operation between the first and second operand as temporary value;
      performing a bitwise AND operation between the first mask and the first operand obtaining a first bit subset;
      performing a bitwise AND operation between the second mask and the second operand obtaining a second bit subset;
      repeating said two bitwise AND operations swapping the masks applied to the operands, obtaining and a third and fourth subset;
      performing a bitwise OR operation between the first and second bit subset setting a fifth bit subset and a bitwise OR operation between the third and fourth bit subset obtaining a sixth bit subset;
      performing a bitwise AND operation of the fifth subset with the first string obtaining a seventh bit subset and a bitwise AND operation of the sixth subset with the second string factor obtaining an eight subset;
      performing an OR of the seventh and eight bit subset and storing the result as new first operand value; and
      setting the new second operand value as the result of a bitwise XOR between said new first operand value computed at the previous step and said temporary value.

In variant embodiments, said converting the control bit value in a first or second string of bits of a given length depending on the value of the control bit, said first or second string of bits being complementary and having the same Hamming weight includes:
  setting a first mask as the value of an even factor alternating an equal number of groups of ones and zeros ending with a zero shifted right by the value of the control bit; and
  setting a second mask to the value of an odd factor, alternating an equal number of groups of zeros and ones ending with a one.

In variant embodiments, setting a second mask to the value of an odd factor includes toggling the bits of a string with all ones according the first mask value, in particular by applying a bitwise XOR operations, so that the first mask and second mask swap their value according to the value of the control bit.

In variant embodiments, the method includes:
  storing the flag in a flag register; and
  storing the first operand in a first register, storing the second operand in a second register, the method providing then that:
    a third register is initialized to zero;
    a fourth register is initialized to zero;
    in the third register said even factor shifted right by the value of the control bit is stored the first mask;

in the fourth register said odd factor is obtained toggling the bits of a string with all ones according the first mask value and XORed with the first mask is stored;

it is stored in a fifth register the first bit subset;
it is stored in a sixth register the second bit subset;
it is stored in the fifth register the fifth bit subset;
it is stored in the fifth register the seventh subset;
it is stored in a sixth register the third subset;
it is stored in the second register the temporary variable which value is obtained by a bitwise XOR operation between the first and second operand;
it is stored in the first register the third subset;
it is stored in the sixth register the sixth subset;
it is stored in the sixth register the eight subset;
it is stored in the first register the bitwise OR of the seventh and eight bit subset as new first operand; and
it is stored in the second register the bitwise XOR of between said new first operand value computed at the previous step and said temporary value as new value of the second operand.

In variant embodiments, said converting the control bit value in a first or second string of bits of a given length depending on the value of the control bit, said first or second string of bits being complementary and having the same Hamming weight includes:

setting a first mask as the value of a even factor alternating an equal number of groups of ones and zeros ending with a zero, said even factor being shifted right by the value of the control bit, in its turn shifted left by a value equal to the logarithm to the base two of said size of the group; and setting a second mask to the value of an odd factor, alternating an equal number of groups of zeros and ones ending with a one, said odd factor being shifted left by the value of the control bit, in its turn shifted left by a value equal to the logarithm to the base two of said size of the group.

In variant embodiments, the operations of the above method are included in an asymmetric cryptographic procedure including performing an iterative operation between a first operand and a second operand using a secret key, said iterative operation including at least, for each bit of the secret key, the steps of:

performing mathematical operations applying two different sets of operations to the first operand and to the second operand depending on the value of a function of the bit of the secret key; and performing a conditional swap on said first and second operand on the basis of a control bit value corresponding to the value of said bit of the secret key.

In variant embodiments, the operations of the above method are included in a conditional copy procedure conditionally assigning a variable to another.

In variant embodiments, said asymmetric cryptographic procedure including performing an iterative operation (includes an ECC scalar multiplication loop or a RSA modular exponentiation loop).

In variant embodiments, said bitwise operation is implemented by a rotation operation.

In variant embodiments, includes storing in the registers includes performing further storing operations of further values in one or more further registers.

The solution here described refers also to embodiments of a processing device configured to perform the steps of the method of any of the previous embodiments.

The solution here described refers also to a computer program product that can be loaded into the memory of at least one computer and comprises parts of software code that are able to execute the steps of the method of any of the previous embodiments when the product is run on at least one computer.

In an embodiment, a method comprises: performing cryptographic operations on data in a processing device; and protecting the performing of the cryptographic operations by conditionally swapping a first operand and a second operand based on a control value, wherein the conditional swapping comprises: setting a first mask of a number of bits and a second mask of the number of bits based on the control value, the first mask and the second mask being complementary and having a same Hamming weight; storing a result of a bitwise XOR operation on the first operand and the second operand as a temporary value; and performing a combination of bitwise logical operations, the combination of bitwise logical operations including: performing a bitwise AND operation between the first mask and the first operand obtaining a first bit subset; performing a bitwise AND operation between the second mask and the second operand obtaining a second bit subset; repeating the two bitwise AND operations swapping the masks applied to the operands, obtaining and a third bit subset and a fourth bit subset; performing a bitwise OR operation between the first bit subset and the second bit subset obtaining a fifth bit subset and a bitwise OR operation between the third bit subset and the fourth bit subset obtaining a sixth bit subset; performing a bitwise AND operation of the fifth bit subset with the first mask obtaining a seventh bit subset and a bitwise AND operation of the sixth bit subset with the second mask obtaining an eight bit subset; storing a result of a bitwise OR operation of the seventh bit subset and the eight bit subset as a value of first operand; and storing a result of a bitwise XOR of the first operand value and the temporary value as a value of the second operand. In an embodiment, the control value is a value of a control bit and the method comprises: setting the first mask as a value of an even factor alternating an equal number of groups of ones and zeros ending with a zero shifted right by the value of the control bit; and setting the second mask to the value of an odd factor, alternating an equal number of groups of zeros and ones ending with a one. In an embodiment, setting the second mask to the value of an odd factor includes toggling the bits of a string with all ones according to the first mask value, by applying bitwise XOR operations, wherein the first mask and second mask swap their value according to the value of the control bit. In an embodiment, the method includes: storing the control value in a flag register; storing the first operand in a first register; storing the second operand in a second register; initializing a third register to zero; initializing a fourth register to zero; storing in the third register the even factor shifted right by the control value; storing in the fourth register the odd factor obtained by toggling the bits of a string with all ones according to the first mask value and XORed with the first mask; storing in a fifth register, the first bit subset; storing in a sixth register, the second bit subset; storing in the fifth register, the fifth bit subset; storing in the fifth register, the seventh bit subset; storing in a sixth register, the third bit subset; storing in the second register, the temporary value; storing in the first register, the third bit subset; storing in the sixth register, the sixth bit subset; storing in the sixth register, the eight bit subset; storing in the first register, the bitwise OR of the seventh bit subset and eight bit subset as the first operand value; and storing in the second register, the second operand value. In an embodiment, the control value is a value of a control bit and the method comprises: setting the first mask as the value of a even factor alternating an equal number of groups of ones and zeros ending with a zero, the even factor being shifted right by the value of the control bit, and shifted left by a value equal to the logarithm to the base two of a size of the group; and setting the second mask to the value of an odd factor, alternating an equal number of groups of zeros and ones ending with a one, the odd factor being shifted left by the value of the control bit, and shifted left by a value equal to the logarithm to the base two of the size of the group. In an embodiment, the cryptographic operations are included in an asymmetric cryptographic procedure including performing an iterative operation between the first operand and the second operand using a secret key the iterative operation including at least, for each bit of the secret key, the steps of: performing mathematical operations applying two different sets of operations to the first operand and to the second operand depending on the value of a function of the bit of the secret key; and performing a conditional swap on the first and second operand on the basis of a control bit value corresponding to the value of the bit of the secret key. In an embodiment, the cryptographic operations are included in a conditional copy procedure conditionally assigning a variable. In an embodiment, the asymmetric cryptographic procedure includes an elliptic curve cryptography (ECC) scalar multiplication loop or a Rivest-Shamir-Adleman (RSA) modular exponentiation loop. In an embodiment, a bitwise operation is implemented by a rotation operation.

In an embodiment, a device comprises: a memory; and cryptographic circuitry coupled to the memory, wherein the cryptographic circuitry, in operation, conditionally swaps a first operand and a second operand of a cryptographic operation based on a control value, the conditional swapping including: setting a first mask of a number of bits and a second mask of the number of bits based on the control value, the first mask and the second mask being complementary and having a same Hamming weight; storing a result of a bitwise XOR operation on the first operand and the second operand as a temporary value; and performing a combination of bitwise logical operations, the combination of bitwise logical operations including: performing a bitwise AND operation between the first mask and the first operand obtaining a first bit subset; performing a bitwise AND operation between the second mask and the second operand obtaining a second bit subset; repeating the two bitwise AND operations swapping the masks applied to the operands, obtaining and a third bit subset and a fourth bit subset; performing a bitwise OR operation between the first bit subset and the second bit subset obtaining a fifth bit subset and a bitwise OR operation between the third bit subset and the fourth bit subset obtaining a sixth bit subset; performing a bitwise AND operation of the fifth bit subset with the first mask obtaining a seventh bit subset and a bitwise AND operation of the sixth bit subset with the second mask obtaining an eight bit subset; storing a result of a bitwise OR operation of the seventh bit subset and the eight bit subset as a value of first operand; and storing a result of a bitwise XOR of the first operand value and the temporary value as a value of the second operand. In an embodiment, the control value is a value of a control bit and the cryptographic circuitry, in operation: sets the first mask as a value of an even factor alternating an equal number of groups of ones and zeros ending with a zero shifted right by the value of the control bit; and sets the second mask to the value of an odd factor, alternating an equal number of groups of zeros and ones ending with a one. In an embodiment, setting the second mask to the value of an odd factor includes toggling the bits of a string with all ones according to the first mask value, by applying bitwise XOR operations, wherein the first mask and second mask swap their value according to the value of the control bit. In an embodiment, the memory includes a plurality of registers and the cryptographic circuitry, in operation: stores the control value in a flag register; stores the first operand in a first register; stores the second operand in a second register; initializes a third register to zero; initializes a fourth register to zero; stores in the third register the even factor shifted right by the control value; stores in the fourth register the odd factor obtained by toggling the bits of a string with all ones according to the first mask value and XORed with the first mask; stores in a fifth register, the first bit subset; stores in a sixth register, the second bit subset; stores in the fifth register, the fifth bit subset; stores in the fifth register, the seventh bit subset; stores in a sixth register, the third bit subset; stores in the second register, the temporary value; stores in the first register, the third bit subset; stores in the sixth register, the sixth bit subset; stores in the sixth register, the eight bit subset; stores in the first register, the bitwise OR of the seventh bit subset and eight bit subset as the first operand value; and stores in the second register, the second operand value. In an embodiment, the control value is a value of a control bit and the cryptographic circuitry, in operation: sets the first mask as the value of a even factor alternating an equal number of groups of ones and zeros ending with a zero, the even factor being shifted right by the value of the control bit, and shifted left by a value equal to the logarithm to the base two of a size of the group; and sets the second mask to the value of an odd factor, alternating an equal number of groups of zeros and ones ending with a one, the odd factor being shifted left by the value of the control bit, and shifted left by a value equal to the logarithm to the base two of the size of the group. In an embodiment, the cryptographic circuitry, in operation, performs an asymmetric cryptographic procedure including performing an iterative operation between the first operand and the second operand using a secret key the iterative operation including at least, for each bit of the secret key: performing mathematical operations applying two different sets of operations to the first operand and to the second operand depending on the value of a function of the bit of the secret key; and performing a conditional swap on the first and second operand on the basis of a control bit value corresponding to the value of the bit of the secret key. In an embodiment, the cryptographic circuitry, in operation, performs a conditional copy procedure conditionally assigning a variable. In an embodiment, the asymmetric cryptographic procedure includes an elliptic curve cryptography (ECC) scalar multiplication loop or a Rivest-Shamir-Adleman (RSA) modular exponentiation loop. In an embodiment, the cryptographic circuitry, in operation, implements at least one bitwise operation as a rotation operation.

In an embodiment, a system comprises: a plurality of registers; and cryptographic circuitry coupled to the plurality of registers, wherein the cryptographic circuitry, in operation, conditionally swaps a first operand and a second operand of a cryptographic operation based on a control value, the conditional swapping including: setting a first mask of a number of bits and a second mask of the number of bits based on the control value, the first mask and the second mask being complementary and having a same Hamming weight; storing a result of a bitwise XOR operation on the first operand and the second operand as a temporary value; and performing a combination of bitwise logical operations, the combination of bitwise logical operations including: performing a bitwise AND operation between the first mask and the first operand obtaining a first bit subset; performing a bitwise AND operation between the second mask and the second operand obtaining a second bit subset; repeating the two bitwise AND operations swapping the masks applied to the operands, obtaining and a third bit subset and a fourth bit subset; performing a bitwise OR operation between the first bit subset and the second bit subset obtaining a fifth bit subset and a bitwise OR operation between the third bit subset and the fourth bit subset obtaining a sixth bit subset; performing a bitwise AND operation of the fifth bit subset with the first mask obtaining a seventh bit subset and a bitwise AND operation of the sixth bit subset with the second mask obtaining an eight bit subset; storing a result of a bitwise OR operation of the seventh bit subset and the eight bit subset as a value of first operand; and storing a result of a bitwise XOR of the first operand value and the temporary value as a value of the second operand. In an embodiment, the control value is a value of a control bit and the cryptographic circuitry, in operation: sets the first mask as a value of an even factor alternating an equal number of groups of ones and zeros ending with a zero shifted right by the value of the control bit; and sets the second mask to the value of an odd factor, alternating an equal number of groups of zeros and ones ending with a one. In an embodiment, the cryptographic circuitry, in operation: stores the control value in a flag register; stores the first operand in a first register; stores the second operand in a second register; initializes a third register to zero; initializes a fourth register to zero; stores in the third register the even factor shifted right by the control value; stores in the fourth register the odd factor obtained by toggling the bits of a string with all ones according to the first mask value and XORed with the first mask; stores in a fifth register, the first bit subset; stores in a sixth register, the second bit subset; stores in the fifth register, the fifth bit subset; stores in the fifth register, the seventh bit subset; stores in a sixth register, the third bit subset; stores in the second register, the temporary value; stores in the first register, the third bit subset; stores in the sixth register, the sixth bit subset; stores in the sixth register, the eight bit subset; stores in the first register, the bitwise OR of the seventh bit subset and eight bit subset as the first operand value; and stores in the second register, the second operand value. In an embodiment, the system comprises an integrated circuit including the cryptographic circuitry and the plurality of registers.

In an embodiment, a non-transitory computer-readable memory's contents configure cryptographic circuitry to perform a conditional swap operation of a first operand and a second operand based on a control value, the conditional swap operation including: setting a first mask of a number of bits and a second mask of the number of bits based on the control value, the first mask and the second mask being complementary and having a same Hamming weight; storing a result of a bitwise XOR operation on the first operand and the second operand as a temporary value; and performing a combination of bitwise logical operations, the combination of bitwise logical operations including: performing a bitwise AND operation between the first mask and the first operand obtaining a first bit subset; performing a bitwise AND operation between the second mask and the second operand obtaining a second bit subset; repeating the two bitwise AND operations swapping the masks applied to the operands, obtaining and a third bit subset and a fourth bit subset; performing a bitwise OR operation between the first bit subset and the second bit subset obtaining a fifth bit subset and a bitwise OR operation between the third bit subset and the fourth bit subset obtaining a sixth bit subset; performing a bitwise AND operation of the fifth bit subset with the first mask obtaining a seventh bit subset and a bitwise AND operation of the sixth bit subset with the second mask obtaining an eight bit subset; storing a result of a bitwise OR operation of the seventh bit subset and the eight bit subset as a value of first operand; and storing a result of a bitwise XOR of the first operand value and the temporary value as a value of the second operand. In an embodiment, the contents comprise instructions executed by the cryptographic circuitry. In an embodiment, the control value is a value of a control bit and the conditional swapping includes: setting the first mask as a value of an even factor alternating an equal number of groups of ones and zeros ending with a zero shifted right by the value of the control bit; and setting the second mask to the value of an odd factor, alternating an equal number of groups of zeros and ones ending with a one.

BRIEF DESCRIPTION OF THE SEVERAL VIEWS OF THE DRAWINGS

The disclosure will now be described purely by way of a non-limiting example with reference to the annexed drawings, in which:

FIG. 1 has been described in the foregoing; and

DETAILED DESCRIPTION

The ensuing description illustrates various specific details aimed at an in-depth understanding of the embodiments. The embodiments may be implemented without one or more of the specific details, or with other methods, components, materials, etc. In other cases, known structures, materials, or operations are not illustrated or described in detail so that various aspects of the embodiments will not be obscured.

Reference to "an embodiment" or "one embodiment" in the framework of the present description is meant to indicate that a particular configuration, structure, or characteristic described in relation to the embodiment is comprised in at least one embodiment. Likewise, phrases such as "in an embodiment" or "in one embodiment", that may be present in various points of the present description, do not necessarily refer to the one and the same embodiment. Furthermore, particular conformations, structures, or characteristics can be combined appropriately in one or more embodiments.

The references used herein are intended merely for convenience and hence do not define the sphere of protection or the scope of the embodiments.

It was observed that the leakages in the previous solution were based on the fact that the power consumption of an instruction depends on the Hamming Weight of the involved variables. The Hamming Weight is the number of binary is in a variable, thus an embodiment of the method here described facilitates keeping constant the number of is (and 0s) in each step of the conditional swap function, no matter if the flag is 1 or 0.

Therefore, describing a conditional swap function implementation with bitwise operators as:

C1 tmp=a^b
C2 a=[(~flg)&tmp]^a
C3 b=a^tmp in a step C1, given the operands a, b a temporary variable tmp stores the value of a bitwise XOR between operands a and b. Then the first operand a is set equal to the bitwise XOR between the first operand a and a bitwise AND between the variable –flg, which corresponds to the control bit c, and the temporary variable tmp.

The second operand b is set to the bitwise XOR between the first operand and the temporary variable tmp.

This, in general, corresponds to performing a conditional swap on a first operand a and a second operand b on the basis of a control bit value, the value of flag, such conditional swap comprising defining a mask which value depends on the value of the control bit, in this case the value of flag acting directly as mask for the temporary variable tmp.

According to an embodiment, the following steps may instead be performed:

S1 m1=0xAAAAAAAA>>flg
S2 m2=0xFFFFFFFF^m1
C1 tmp=a^b
S3 a={[(m1&a)|(m2&b)]&0xAAAAAAAA} or {[(m1&b)|(m2&a)]&0x55555555}
C4 b=a^tmp In other words, a first mask m1 is set in operation S1 to the value 0xAAAAAAAA shifted right by the value of the flag flg or control bit. 0xAAAAAAAA in binary alternates ones and zeros ending with a zero, 1010 1010 1010 1010 1010 1010 1010 1010.

A second mask m2 is set in operation S2 to the value 0xFFFFFF XORed with the first mask m1 value. 0xFFFFFF in binary is represented by a string of consecutive ones, 1111 1111 1111 1111 1111 1111, performing the XOR corresponds substantially to toggling the bits of a string with all ones according the first mask value m1, so that the complementary string of the first mask is obtained as second mask m2.

Thus, if the flag flg is zero the first mask m1 is 0xAAAAAAAA and the second mask m2 0x55555555, if the flag flg is 1 the first mask m1 is 0x55555555 and the second mask m2 0xAAAAAAAA. Thus according to the value of flag flg, the masks m1, m2 swap their value between 0xAAAAAAAA and 0x55555555, which are, in a binary representation, complementary values, bitwise each bit of a string is the complementary of the corresponding bit in the other string, or, as indicated above, is the corresponding bit in the other string, toggled.

Then, a temporary variable tmp stores the value of the bitwise XOR between the first operand a and the second operand b.

The first operand a is set then to the value result of (m1 AND a OR m2 AND b) AND 0xAAAAAAAA OR (M1 AND b OR m2 AND a) AND 0x55555555. 0x5555555555 in binary alternates ones and zeros ending with a one, is a shift of 0xAAAAAAAA. All the operations just indicated are bitwise operation.

Therefore operation S3 is a combination of bitwise logical operations which returns a=a if flg=0 and a=b if flg=1.

Then again, the second operand b is the result of the first operand a XOR the temporary variable tmp, b=a XOR TMP (operation C4).

Thus, in an embodiment the method for performing cryptographic operations on data in a processing device including:

performing a conditional swap on a first and a second operand a, b on the basis of a control bit c or flg value, where the conditional swap comprises defining a mask which value depends on the value of the control bit, includes that said conditional swap comprises:
converting the control bit c value in a first and second string of bits of a given length, the masks m1, m2 depending on the value of the control bit c or flg, said first or second string of bits being complementary and having the same Hamming weight, where the converting including:
setting S1 as first mask m1 the first string and setting S2 as second mask m2 the second string, in the example is 0xFFFFFFFF^m1, to obtain 0x55555555 as second string;
storing C1 in a temporary variable tmp the value of a bitwise XOR operation between the first operand a and second operand b; and
performing S3 a combination of bitwise logical operations which yield the first operand a or the second operand b depending on the flag value flg, such combination comprising:
performing a bitwise AND operation between the first mask m1 and the first operand a obtaining a first bit subset m1&a;
performing a bitwise AND operation between the second mask m2 and the second operand b obtaining a second bit subset m2&b;
repeating said two bitwise AND operations swapping the masks m1, m2 applied to the operands a,b, obtaining and a third subset m1&b and fourth subset m2&a, performing a bitwise AND operation between the first mask m1 and the second operand b and performing a bitwise AND operation between the second mask m2 and the first operand a;
performing a bitwise OR operation between the first and second bit subset setting a fifth bit subset, (m1&a)|(m2&b), and a bitwise OR operation between the third and fourth bit subset obtaining a sixth bit subset, (m1&b)|(m2&a);
performing a bitwise AND operation of the fifth subset with the first string 0xAAAAAAAA, obtaining a seventh bit subset {[(m1&a)|(m2&6)]&0xAAAAAAAA} and a bitwise AND operation of the sixth subset with the second string 0x55555555 obtaining an eight subset {[(m1&6)|(m2&a)]&0x55555555};
performing a bitwise AND of the seventh and eight bit subset and storing the result, {[(m1&a)|(m2&6)]&0xAAAAAAAA}|{[(m1&b)|(m2&a)]&0x55555555}, as new first operand value a; and
setting C4 the new second operand value b as the result of a bitwise XOR between such new first operand value, variable a, computed at the previous step and such value in such temporary value tmp.

In the exemplary embodiment shown above:
converting the control bit flg or c value in a first or second string of bits of a given length depending on the value of the control bit (c), said first or second string of bits being complementary and having the same Hamming weight includes:
setting a first mask m1 as the value of an even factor 0xAAAAAAAA alternating an equal number of groups of ones and zeros ending with a zero shifted right by the value of the control bit; and
setting a second mask m2 to the value of an odd factor, 0xFFFFFF, alternating an equal number of groups of zeros and ones ending with a one.

Then indicating with:
R0←flg, storing the flag flg in a flag register R0,
R1←a, storing the first operand in a first register R1,
R2←b, storing the second operand in a second register R2, the registers R0, R1, R2 of a processing unit implementing the method here described, in which the flag flg and the operands are stored, the solution described requires the following register operations:

R3←0, register R3 is initialized to zero,
R4←0, register R4 is initialized to zero,
R3←0xAAAAAAAA>>R0, in register R3 is stored the first mask m1 which is set to the value: 0xAAAAAAAA shifted right by the value of the flag (step S1),
R4←0xFFFFFFFF^R3, in register R4 is stored the second mask m2 which is set to 0xFFFFFFFF XORed with the first mask m1 (step S2),
R5←R3 & R1, it is stored in register R5 m1&a,
R6←R4 & R2, it is stored in register R6 m2&b,
R5←R5|R6, it is stored in register R5 (m1&a)|(m2&b),
R5←R5 & 0xAAAAAAAA, it is stored in register R5 (m1&a)|(m2&b)]&0xAAAAAAAA},
R6←R3 & R2, it is stored in register m1&b,
R2←R1^R2, it is stored in register R2 a XOR b, the temporary variable tmp,
R1←R4 & R1, it is stored in register R1 m2&a,
R6←R1|R6, it is stored in register R6 (m1&b)|(m2&a),
R6←R6 & 0x55555555, it is stored in register R6 {[(m1&b)|(m2&a)]&0x55555555}
R1←R5|R6 it is stored in register R1 {[(m1&a)| (m2&b)]&0xAAAAAAAA} or |{[(m1&b)| (m2&a)]&0x55555555},
R2←R1^R2 it is stored in register R2, a^tmp as value of second operand b (step C4).

As shown above, the method involves two variable assignments, one shift, six bitwise AND, for a total of 15 operations, three bitwise OR, and three bitwise XOR, involving seven registers R0 . . . R6.

In the table here below is indicated the Hamming Weight HW of the above operations.

TABLE 1

| Register operation | HW |
| --- | --- |
| R3 ← 0 | 0 |
| R4 ← 0 | 0 |
| R3 ← 0xAAAAAAAA >> R0 | 50% |
| R4 ← 0xFFFFFFFF ^ R3 | 50% |
| R5 ← R3 & R1 | ~25% |
| R6 ← R4 & R2 | ~25% |
| R5 ← R5 | R6 | ~50% |
| R5 ← R5 & 0xAAAAAAAA | ~25% |
| R6 ← R3 & R2 | ~25% |
| R2 ← R1 ^ R2 | ~50% |
| R1 ← R4 & R1 | ~25% |
| R6 ← R1 | R6 | ~50% |
| R6 ← R6 & 0x55555555 | ~25% |
| R1 ← R5 | R6 | ~50% |
| R2 ← R1 ^ R2 | ~50% |

In general, given a word size W of the operands a, b, indicated a size parameter N as 1,2,4,8,16 . . . ,W/2, an even factor Feven, if, e.g., the word size W is 32, can be selected among the five values for size N=1, 2 . . . 16: 0x . . . . A . . . A/0x . . . . C . . . C/0x . . . . F0 . . . F0/0xFF00 . . . FF000/0xFFFF0000, an alternating of ones and zeroes ending with zero in groups of size of N bits, N=1, 2, 4, 8, 16.

In the same way, the odd factor Fodd may be 0x5 . . . 5/0x . . . 3 . . . 3/0x . . . 0F . . . 0F/0x00FF . . . 00FF/0x0000FFFF, an alternating of ones and zeroes ending with one in groups of size of N bits, N=1, 2, 4, 8, 16.

Thus, the first mask m1 can be:
m1=Feven>>(flg<<log 2N)
and the second mask m2
m2=Fodd<<(flg<<log 2N)
a={[(m1&a)|(m2&b)]&Feven} |{[(m1&6)|(m2&a)] &Fodd}
b=a^(a^b)

Thus, in this case converting the control bit value or flag flg in a first or second string of bits of a given length depending on the value of the control bit, said first or second string of bits being complementary and having the same Hamming weight includes:
setting a first mask m1 as the value of an even factor Feven alternating an equal number of groups of ones and zeros ending with a zero, said even factor Feven being shifted right by the value of the control bit, flag flg, in its turn shifted left by a value equal to the binary logarithm, or logarithm to the base two, of said size N of the group; and
setting a second mask m2 to the value of an odd factor Fodd, alternating an equal number of groups of zeros and ones ending with a one, said odd factor Fodd being shifted left by the value of the flag flg, in its turn shifted left by a value equal to the logarithm to the base two of said size N of the group.

In setting the value of the control bit, doing 'flg<<log$_2$N' means that the flag flg is left-shifted by a number of bits that is the base-2 logarithm of N.

For example, if it is chosen N=16, then Feven=0xFFFF0000 and Fodd=0x0000FFFF. Then:
if flg=0, then m1=0xFFFF0000>>(0<<4)=0xFFFF0000,
If flg=1, then m1=0xFFFF0000>>(1<<4)= 0xFFFF0000>>16=0x0000FFFF.

Figure 2:
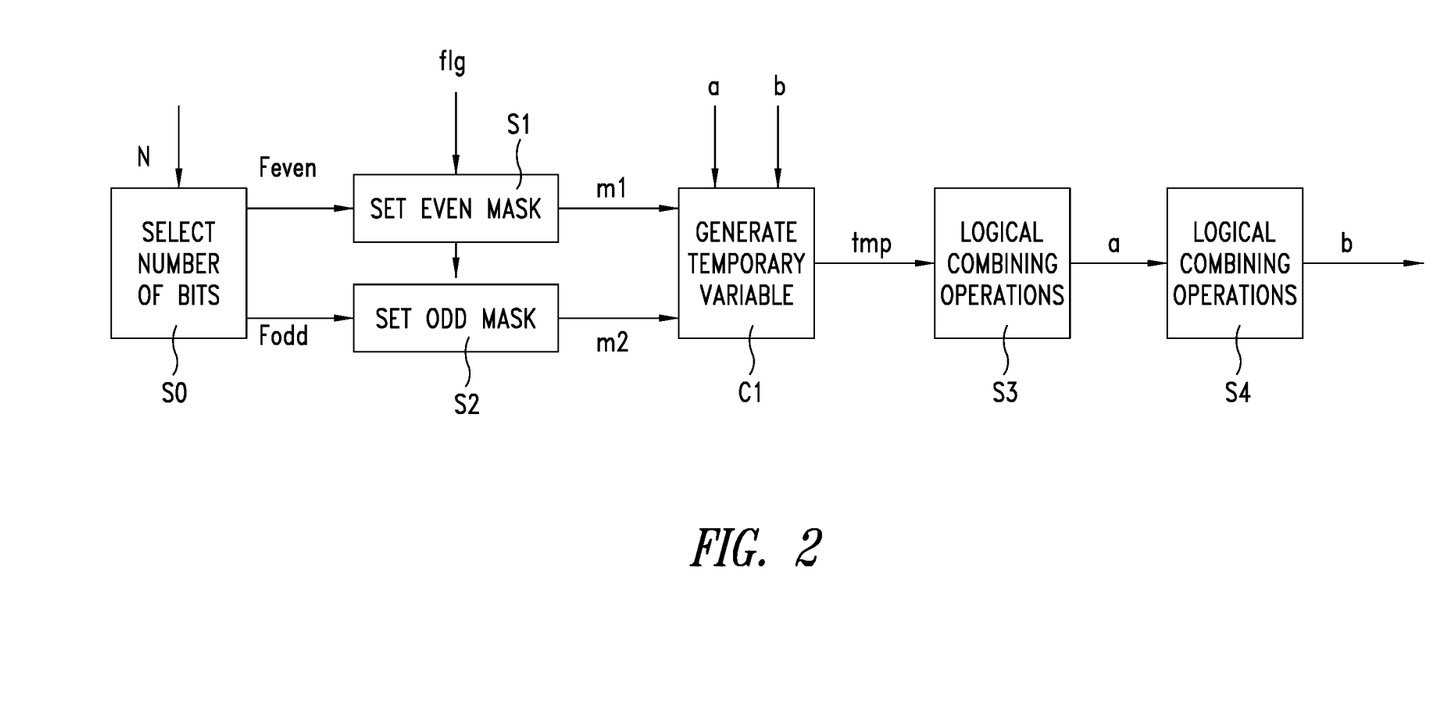
FIG. 2 represents a flow diagram of an embodiment of the method here described.

In FIG. 2 it is shown an exemplary diagram of an embodiment of the conditional swap here described.

With S0 is indicated an additional step of selecting a size parameter N to select the number of bits in the groups of the even factor Feven and the odd factor Fodd.

Then the method includes a block S1 representing setting as first mask m1 the first string, e.g., even factor Feven, and a block S2 representing storing a second mask m2 the second string, e.g., odd factor Fodd Then a block C1 represents restoring in a temporary variable tmp the value of a bitwise XOR operation between the first a and second b operand supplied as input to block C1. Block S3 represents performing a combination S3 of bitwise logical operations which yield the first operand or the second operand depending on the flag (flg) value, according to the expression above, e.g., a={[(m1&a)| (m2&b)]&Feven} |{[(m1&b)|(m2&a)]&Fodd}.

Finally block S4 represents setting the new second operand value as the result of a bitwise XOR between the previous first operand value and the previous second operand value.

Masks could also be two complementary sequences of 0s and 1s such that each mask has the same number of 0s and 1s In variant embodiments the method here described can also be used to conditionally assign a variable to another (Conditional Copy):
if (flag==1)
x=y In variant embodiments, since storing R3←0xAAAAAAAA>>R0 may be different if R0, e.g., the flag, is 0 or 1, then rotate right by 30 or 31 bits can be used, R3←ROR(0xAAAAAAAA, R0+30)

A rotation by the value 30 corresponds to perform no change.

A rotation the value 31 corresponds to perform a right shift by one position.

Thus, the bitwise shift operation may be implemented by a rotation operation.

Also, if there are writing operations in the same register too close to the previous writing operation n the same register, e.g., R5←R3 & R1 and R5←R5 & 0xAAAAAAAA, useless instructions removing leakage, such as writing in a further register R7 useless values, can be used.

Here below is an example of the solution implementing such two techniques:

R3←0
R4←0
R3←ROR(0xAAAAAAAA, R0+30)
R4←0xFFFFFFFF^R3
R5←R3 & R1
R6←R4 & R2
R5←R5|R6
R6←R3 & R2
R2←R1^R2
R1←R4 & R1
R6←R1|R6
R7←R7+R7
R5←R5 & 0xAAAAAAAA
R7←R7+R7
R6←R6 & 0x55555555
R1←R5|R6
R2←R1^R2

Thus, storing in the registers may include performing further storing operations of further values in one or more further registers The solution according to the various embodiments here described allows to obtain the following advantages.

This solution advantageously employs a cswap which intrinsically protects against power analysis because it keeps the power consumption constant, thanks to the invariant of the hamming weight in every step of the process.

Conditional masking leaks information on the conditional flag through power analysis. Indeed, masks allow to proceed the computation only for the correct value, and the way it is chosen permits to recover the flag.

In embodiments, the solution here described splits the inputs in two parts, and put together the corresponding parts belonging to the different inputs. In this way, the masks have not to choose between different words, but between shifts of the same word, extracting/removing a constant quantity of bits from each word.

Of course, without prejudice to the principle of the embodiments, the details of construction and the embodiments may vary widely with respect to what has been described and illustrated herein purely by way of example, without thereby departing from the scope of the present embodiments, as defined the ensuing claims.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
performing cryptographic operations on data in a processing device; and
protecting, by the processing device, the performing of the cryptographic operations on the data against horizontal attacks by conditionally swapping a first operand and a second operand based on a control value, wherein the conditional swapping comprises:
setting a first mask of a number of bits and a second mask of the number of bits based on the control value, the first mask and the second mask being complementary and having a same Hamming weight;
performing a bitwise XOR operation on the first operand and the second operand;
storing a result of the bitwise XOR operation on the first operand and the second operand as a temporary value; and
performing a combination of bitwise logical operations, the combination of bitwise logical operations including:
performing a bitwise AND operation between the first mask and the first operand obtaining a first bit subset;
performing a bitwise AND operation between the second mask and the second operand obtaining a second bit subset;
performing a bitwise AND operation between the second mask and the first operand obtaining a third bit subset;
performing a bitwise AND operation between the first mask and the second operand obtaining a fourth bit subset;
performing a bitwise OR operation between the first bit subset and the second bit subset obtaining a fifth bit subset and a bitwise OR operation between the third bit subset and the fourth bit subset obtaining a sixth bit subset;
performing a bitwise AND operation of the fifth bit subset with the first mask obtaining a seventh bit subset and a bitwise AND operation of the sixth bit subset with the second mask obtaining an eighth bit subset;

performing a bitwise OR operation of the seventh bit subset and the eighth bit subset;

storing a result of the bitwise OR operation of the seventh bit subset and the eighth bit subset as a value of first operand;

performing a bitwise XOR of the first operand value and the temporary value; and storing a result of the bitwise XOR of the first operand value and the temporary value as a value of the second operand.

2. The method according to claim 1, wherein the control value is a value of a control bit and the method comprises:

setting the first mask as a value of an even factor alternating an equal number of groups of ones and zeros ending with a zero shifted right by the value of the control bit; and setting the second mask to the value of an odd factor, alternating an equal number of groups of zeros and ones ending with a one.

3. The method according to claim 2, wherein setting the second mask to the value of an odd factor includes toggling the bits of a string with all ones according to the first mask value, by applying bitwise XOR operations, wherein the first mask and second mask swap their value according to the value of the control bit.

4. The method according to claim 2, including:

storing the control value in a flag register;

storing the first operand in a first register;

storing the second operand in a second register;

initializing a third register to zero;

initializing a fourth register to zero;

storing in the third register the even factor shifted right by the control value;

storing in the fourth register the odd factor obtained by toggling the bits of a string with all ones according to the first mask value and XORed with the first mask;

storing in a fifth register, the first bit subset;

storing in the sixth register, the second bit subset;

storing in the fifth register, the fifth bit subset;

storing in the fifth register, the seventh bit subset;

storing in the sixth register, the third bit subset;

storing in the second register, the temporary value;

storing in the first register, the third bit subset;

storing in the sixth register, the sixth bit subset;

storing in the sixth register, the eighth bit subset;

storing in the first register, the bitwise OR of the seventh bit subset and eighth bit subset as the first operand value; and storing in the second register, the second operand value.

5. The method according to claim 1, wherein the control value is a value of a control bit and the method comprises:

setting the first mask as the value of an even factor alternating an equal number of groups of ones and zeros ending with a zero, the even factor being shifted right by the value of the control bit, and shifted left by a value equal to the logarithm to the base two of a size of the group; and setting the second mask to the value of an odd factor, alternating an equal number of groups of zeros and ones ending with a one, the odd factor being shifted left by the value of the control bit, and shifted left by a value equal to the logarithm to the base two of the size of the group.

6. The method according to claim 1, where the cryptographic operations are included in an asymmetric cryptographic procedure including performing an iterative operation between the first operand and the second operand using a secret key, the iterative operation including at least, for each bit of the secret key, the steps of:

performing mathematical operations applying two different sets of operations to the first operand and to the second operand depending on the value of a function of the bit of the secret key; and performing a conditional swap on the first and second operand on the basis of a control bit value corresponding to the value of the bit of the secret key.

7. The method according to claim 1, where the cryptographic operations are included in a conditional copy procedure conditionally assigning a variable.

8. The method according to claim 6, wherein the asymmetric cryptographic procedure includes an elliptic curve cryptography (ECC) scalar multiplication loop or a Rivest-Shamir-Adleman (RSA) modular exponentiation loop.

9. The method according to claim 1, wherein a bitwise operation is implemented by a rotation operation.

10. A device, comprising:

a memory; and cryptographic circuitry coupled to the memory, wherein the cryptographic circuitry, in operation, performs a cryptographic operation on data and protects the performing of the cryptographic operation on the data against horizontal attacks, the protecting against horizontal attacks including conditionally swapping a first operand and a second operand of the cryptographic operation based on a control value, the conditional swapping including:

setting a first mask of a number of bits and a second mask of the number of bits based on the control value, the first mask and the second mask being complementary and having a same Hamming weight;

performing a bitwise XOR operation on the first operand and the second operand;

storing a result of the bitwise XOR operation on the first operand and the second operand as a temporary value; and performing a combination of bitwise logical operations, the combination of bitwise logical operations including:

performing a bitwise AND operation between the first mask and the first operand obtaining a first bit subset;

performing a bitwise AND operation between the second mask and the second operand obtaining a second bit subset;

performing a bitwise AND operation between the second mask and the first operand obtaining a third bit subset;

performing a bitwise AND operation between the first mask and the second operand obtaining a fourth bit subset;

performing a bitwise OR operation between the first bit subset and the second bit subset obtaining a fifth bit subset and a bitwise OR operation between the third bit subset and the fourth bit subset obtaining a sixth bit subset;

performing a bitwise AND operation of the fifth bit subset with the first mask obtaining a seventh bit subset and a bitwise AND operation of the sixth bit subset with the second mask obtaining an eighth bit subset;
performing a bitwise OR operation of the seventh bit subset and the eighth bit subset;
storing a result of the bitwise OR operation of the seventh bit subset and the eighth bit subset as a value of first operand;
performing a bitwise XOR of the first operand value and the temporary value; and
storing a result of the bitwise XOR of the first operand value and the temporary value as a value of the second operand.

11. The device of claim 10, wherein the control value is a value of a control bit and the cryptographic circuitry, in operation:
sets the first mask as a value of an even factor alternating an equal number of groups of ones and zeros ending with a zero shifted right by the value of the control bit; and
sets the second mask to the value of an odd factor, alternating an equal number of groups of zeros and ones ending with a one.

12. The device of claim 11, wherein setting the second mask to the value of the odd factor includes toggling the bits of a string with all ones according to the first mask value, by applying bitwise XOR operations, wherein the first mask and second mask swap their value according to the value of the control bit.

13. The device of claim 11, wherein the memory includes a plurality of registers and the cryptographic circuitry, in operation:
stores the control value in a flag register;
stores the first operand in a first register;
stores the second operand in a second register;
initializes a third register to zero;
initializes a fourth register to zero;
stores in the third register the even factor shifted right by the control value;
stores in the fourth register the odd factor obtained by toggling the bits of a string with all ones according to the first mask value and XORed with the first mask;
stores in a fifth register, the first bit subset;
stores in a sixth register, the second bit subset;
stores in the fifth register, the fifth bit subset;
stores in the fifth register, the seventh bit subset;
stores in the sixth register, the third bit subset;
stores in the second register, the temporary value;
stores in the first register, the third bit subset;
stores in the sixth register, the sixth bit subset;
stores in the sixth register, the eighth bit subset;
stores in the first register, the bitwise OR of the seventh bit subset and eighth bit subset as the first operand value; and
stores in the second register, the second operand value.

14. The device of claim 10, wherein the control value is a value of a control bit and the cryptographic circuitry, in operation:
sets the first mask as the value of an even factor alternating an equal number of groups of ones and zeros ending with a zero, the even factor being shifted right by the value of the control bit, and shifted left by a value equal to the logarithm to the base two of a size of the group; and
sets the second mask to the value of an odd factor, alternating an equal number of groups of zeros and ones ending with a one, the odd factor being shifted left by the value of the control bit, and shifted left by a value equal to the logarithm to the base two of the size of the group.

15. The device of claim 10, wherein the cryptographic circuitry, in operation, performs an asymmetric cryptographic procedure including performing an iterative operation between the first operand and the second operand using a secret key, the iterative operation including at least, for each bit of the secret key:
performing mathematical operations applying two different sets of operations to the first operand and to the second operand depending on the value of a function of the bit of the secret key; and
performing a conditional swap on the first and second operand on the basis of a control bit value corresponding to the value of the bit of the secret key.

16. The device of claim 10, wherein the cryptographic circuitry, in operation, performs a conditional copy procedure conditionally assigning a variable.

17. The device of claim 15, wherein the asymmetric cryptographic procedure includes an elliptic curve cryptography (ECC) scalar multiplication loop or a Rivest-Shamir-Adleman (RSA) modular exponentiation loop.

18. The device of claim 10, wherein the cryptographic circuitry, in operation, implements at least one bitwise operation as a rotation operation.

19. A system, comprising:
a plurality of registers; and
cryptographic circuitry coupled to the plurality of registers, wherein the cryptographic circuitry, in operation, performs a cryptographic operation on data and protects the performing of the cryptographic operation on the data against horizontal attacks, the protecting against horizontal attacks including conditionally swapping a first operand and a second operand of the cryptographic operation based on a control value, the conditional swapping including:
setting a first mask of a number of bits and a second mask of the number of bits based on the control value, the first mask and the second mask being complementary and having a same Hamming weight;
performing a bitwise XOR operation on the first operand and the second operand;
storing a result of the bitwise XOR operation on the first operand and the second operand as a temporary value; and
performing a combination of bitwise logical operations, the combination of bitwise logical operations including:
performing a bitwise AND operation between the first mask and the first operand obtaining a first bit subset;
performing a bitwise AND operation between the second mask and the second operand obtaining a second bit subset;
performing a bitwise AND operation between the second mask and the first operand obtaining a third bit subset;
performing a bitwise AND operation between the first mask and the second operand obtaining a fourth bit subset;
performing a bitwise OR operation between the first bit subset and the second bit subset obtaining a fifth bit subset and a bitwise OR operation between the third bit subset and the fourth bit subset obtaining a sixth bit subset;

performing a bitwise AND operation of the fifth bit subset with the first mask obtaining a seventh bit subset and a bitwise AND operation of the sixth bit subset with the second mask obtaining an eighth bit subset;

performing a bitwise OR operation of the seventh bit subset and the eighth bit subset;

storing a result of the bitwise OR operation of the seventh bit subset and the eighth bit subset as a value of the first operand;

performing a bitwise XOR of the first operand value and the temporary value; and storing a result of the bitwise XOR of the first operand value and the temporary value as a value of the second operand.

20. The system of claim 19, wherein the control value is a value of a control bit and the cryptographic circuitry, in operation:

sets the first mask as a value of an even factor alternating an equal number of groups of ones and zeros ending with a zero shifted right by the value of the control bit; and sets the second mask to the value of an odd factor, alternating an equal number of groups of zeros and ones ending with a one.

21. The system of claim 20, wherein the cryptographic circuitry, in operation:

stores the control value in a flag register;
stores the first operand in a first register;
stores the second operand in a second register;
initializes a third register to zero;
initializes a fourth register to zero;
stores in the third register the even factor shifted right by the control value;
stores in the fourth register the odd factor obtained by toggling the bits of a string with all ones according to the first mask value and XORed with the first mask;
stores in a fifth register, the first bit subset;
stores in a sixth register, the second bit subset;
stores in the fifth register, the fifth bit subset;
stores in the fifth register, the seventh bit subset;
stores in the sixth register, the third bit subset;
stores in the second register, the temporary value;
stores in the first register, the third bit subset;
stores in the sixth register, the sixth bit subset;
stores in the sixth register, the eighth bit subset;
stores in the first register, the bitwise OR of the seventh bit subset and eighth bit subset as the first operand value; and
stores in the second register, the second operand value.

22. The system of claim 19, comprising an integrated circuit including the cryptographic circuitry and the plurality of registers.

23. A non-transitory computer-readable memory having contents which configure cryptographic circuitry to perform a cryptographic operation and to protect the performing of the cryptographic operation, the protecting including a conditional swap operation of a first operand and a second operand based on a control value, the conditional swap operation including:

setting a first mask of a number of bits and a second mask of the number of bits based on the control value, the first mask and the second mask being complementary and having a same Hamming weight;

performing a bitwise XOR operation on the first operand and the second operand;

storing a result of the bitwise XOR operation on the first operand and the second operand as a temporary value; and performing a combination of bitwise logical operations, the combination of bitwise logical operations including:

performing a bitwise AND operation between the first mask and the first operand obtaining a first bit subset;

performing a bitwise AND operation between the second mask and the second operand obtaining a second bit subset;

performing a bitwise AND operation between the second mask and the first operand obtaining a third bit subset;

performing a bitwise AND operation between the first mask and the second operand obtaining a fourth bit subset;

performing a bitwise OR operation between the first bit subset and the second bit subset obtaining a fifth bit subset and a bitwise OR operation between the third bit subset and the fourth bit subset obtaining a sixth bit subset;

performing a bitwise AND operation of the fifth bit subset with the first mask obtaining a seventh bit subset and a bitwise AND operation of the sixth bit subset with the second mask obtaining an eighth bit subset;

performing a bitwise OR operation of the seventh bit subset and the eighth bit subset;

storing a result of the bitwise OR operation of the seventh bit subset and the eighth bit subset as a value of the first operand;

performing a bitwise XOR of the first operand value and the temporary value; and storing a result of the bitwise XOR of the first operand value and the temporary value as a value of the second operand.

24. The non-transitory computer-readable memory of claim 23, wherein the contents comprise instructions executed by the cryptographic circuitry.

25. The non-transitory computer-readable memory of claim 23, wherein the control value is a value of a control bit and the conditional swapping includes:

setting the first mask as a value of an even factor alternating an equal number of groups of ones and zeros ending with a zero shifted right by the value of the control bit; and setting the second mask to the value of an odd factor, alternating an equal number of groups of zeros and ones ending with a one.

* * * * *

UNITED STATES PATENT AND TRADEMARK OFFICE
CERTIFICATE OF CORRECTION

PATENT NO. : 11,811,906 B2
APPLICATION NO. : 17/203590
DATED : November 7, 2023
INVENTOR(S) : Matteo Bocchi Page 1 of 1

It is certified that error appears in the above-identified patent and that said Letters Patent is hereby corrected as shown below:

In the Claims

<u>Column 23, Claim 23, Lines 57-58:</u>
"the cryptographic operation, the protecting including a conditional swap operation"
Should read:
--the cryptographic operation against horizontal attacks, the protecting against horizontal attacks including a conditional swap operation--.

Signed and Sealed this
Twenty-sixth Day of December, 2023

Katherine Kelly Vidal
*Director of the United States Patent and Trademark Office*